(12) United States Patent
Sandell et al.

(10) Patent No.: US 8,922,396 B2
(45) Date of Patent: Dec. 30, 2014

(54) AUTOMATIC REMINDER FUNCTION

(75) Inventors: Gordon Robert Andrew Sandell, Bothell, WA (US); Bradley David Cornell, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 457 days.

(21) Appl. No.: 12/625,902

(22) Filed: Nov. 25, 2009

(65) Prior Publication Data

US 2011/0121999 A1    May 26, 2011

(51) Int. Cl.
| | | |
|---|---|---|
| G08B 21/00 | (2006.01) |
| G08B 23/00 | (2006.01) |
| B60Q 1/00 | (2006.01) |
| G08G 5/00 | (2006.01) |
| B64D 45/00 | (2006.01) |

(52) U.S. Cl.
CPC .......... B64D 45/0015 (2013.01); G08G 5/0021 (2013.01); G08G 5/0052 (2013.01)
USPC ........... 340/971; 340/945; 340/963; 340/964; 340/457

(58) Field of Classification Search
CPC ................. B64D 45/0015; B64D 2700/62271; G01C 23/00
USPC ........................................ 340/971
See application file for complete search history.

(56) References Cited

U.S. PATENT DOCUMENTS

| | | | |
|---|---|---|---|
| 4,879,542 A * | 11/1989 | Elsey ............................ | 340/326 |
| 5,243,339 A * | 9/1993 | Graham et al. ............... | 340/945 |
| 5,454,074 A | 9/1995 | Hartel et al. | |
| 6,259,380 B1 * | 7/2001 | Jensen ........................... | 340/970 |
| 6,571,155 B2 * | 5/2003 | Carriker et al. .................. | 701/3 |
| 6,633,810 B1 * | 10/2003 | Qureshi et al. ................ | 701/467 |
| 6,693,559 B1 * | 2/2004 | Gyde et al. ..................... | 340/974 |
| 6,785,594 B1 * | 8/2004 | Bateman et al. .................. | 701/9 |
| 6,822,631 B1 * | 11/2004 | Yatabe ............................ | 345/89 |
| 7,129,857 B1 * | 10/2006 | Spirkovska .................... | 340/971 |
| 7,391,305 B2 * | 6/2008 | Knoll et al. .................... | 340/438 |
| 7,630,710 B2 * | 12/2009 | Kauffman ...................... | 455/431 |
| 7,911,334 B2 * | 3/2011 | Busey ......................... | 340/539.1 |
| 7,969,327 B2 * | 6/2011 | Christophe et al. ........... | 340/963 |

(Continued)

FOREIGN PATENT DOCUMENTS

GB    2445098 A    6/2008

OTHER PUBLICATIONS

Combined Search and Examination Report in GB Application No. GB1018031.3 dated Feb. 16, 2011.

(Continued)

*Primary Examiner* — Daniel Wu
*Assistant Examiner* — Mohamed Barakat
(74) *Attorney, Agent, or Firm* — Hope Baldauff, LLC

(57) ABSTRACT

Technologies are described herein for providing an automatic reminder function. The technologies are adapted to receive a definition of a reminder as an occurrence or are non-occurrence of an event and to receive operationally relevant data from a system data device. The technologies then determine whether the operationally relevant data indicates that the reminder is triggered by the occurrence or non-occurrence of the event. Responsive to determining whether the operationally relevant data indicates that the reminder is triggered by the occurrence or non-occurrence of the event, the technologies issue the reminder through instrumentation on an aircraft.

18 Claims, 7 Drawing Sheets

(56) References Cited

U.S. PATENT DOCUMENTS

| | | | |
|---|---|---|---|
| 8,089,175 B2* | 1/2012 | Stiesdal | 290/55 |
| 8,098,175 B2* | 1/2012 | Berthou et al. | 340/945 |
| 2003/0058134 A1* | 3/2003 | Sherry et al. | 340/945 |
| 2006/0025900 A1 | 2/2006 | Arnouse | |
| 2006/0195235 A1* | 8/2006 | Ishihara et al. | 701/16 |
| 2007/0015457 A1* | 1/2007 | Krampf et al. | 455/3.06 |
| 2008/0154441 A1* | 6/2008 | Harrison et al. | 701/3 |
| 2009/0109038 A1 | 4/2009 | Christophe et al. | |
| 2010/0201530 A1 | 8/2010 | Wende | |

OTHER PUBLICATIONS

GB Examination Report dated Apr. 4, 2012 in GB Application No. GB1018031.3.

* cited by examiner

AUTOMATIC REMINDER FUNCTION

BACKGROUND

Flight crew may perform various activities during a flight on an aircraft. These activities may be performed upon the occurrence of specified events during the flight (e.g., change flight crew at 15:00, report to air traffic control when a given waypoint is reached, etc.). Conventionally, the flight crew may recall such activities by writing hand-written notes or by attempting to memorize the events that trigger the activities. The flight crew may then determine when the activities are performed by manually monitoring the occurrence of the events. For example, the flight crew may monitor the clock and/or monitor instruments on the flight deck of an aircraft indicating the occurrence of the events. However, such an approach to recalling the events that trigger the activities and identifying the occurrence of the events may be subject to human error and may add to the flight crew's workload.

It is with respect to these and other considerations that the disclosure made herein is presented.

SUMMARY

Technologies are described herein for providing a crew-defined reminder system. According to embodiments, the crew-defined reminder system may operate as a function of operationally relevant events. In particular, through the crew-defined reminder system, a flight crew member may define reminders that are triggered responsive to the occurrence and/or non-occurrence of one or more events associated with the operation of an aircraft. When a reminder is triggered, an alert mechanism may audibly and/or visually alert the flight crew of the reminder. Through the embodiments described herein, the flight crew can be automatically notified of operationally relevant event-triggered activities without maintaining hand-written notes, memorizing events, and/or manually monitoring the occurrence of such events.

According to one aspect presented herein, various technologies provide for an automatic reminder function. The technologies are adapted to receive a definition of a reminder as an occurrence or non-occurrence of an event and to receive operationally relevant data from a system data device. The technologies then determine whether the operationally relevant data indicates that the reminder is triggered by the occurrence or non-occurrence of the event. Responsive to determining whether the operationally relevant data indicates that the reminder is triggered by the occurrence or non-occurrence of the event, the technologies issue the reminder through instrumentation on an aircraft.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a crew-defined reminder system. According to some embodiments described herein, a flight deck may be adapted or equipped with a crew-defined reminder system having a reminder setting interface, a determination module, and an alert mechanism. Through the reminder setting interface, the flight crew can define reminders that are triggered by the occurrence and/or non-occurrence of one or more operationally relevant events associated with a flight of an aircraft. During the flight, the determination module may monitor the occurrence and/or non-occurrence of the operationally relevant events that trigger the reminders. When a reminder is triggered, the determination module may issue the reminder to flight crew by providing a visual and/or aural alert through the alert mechanism. If additional notifications of the reminder are available, the determination module may also reset the reminder.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
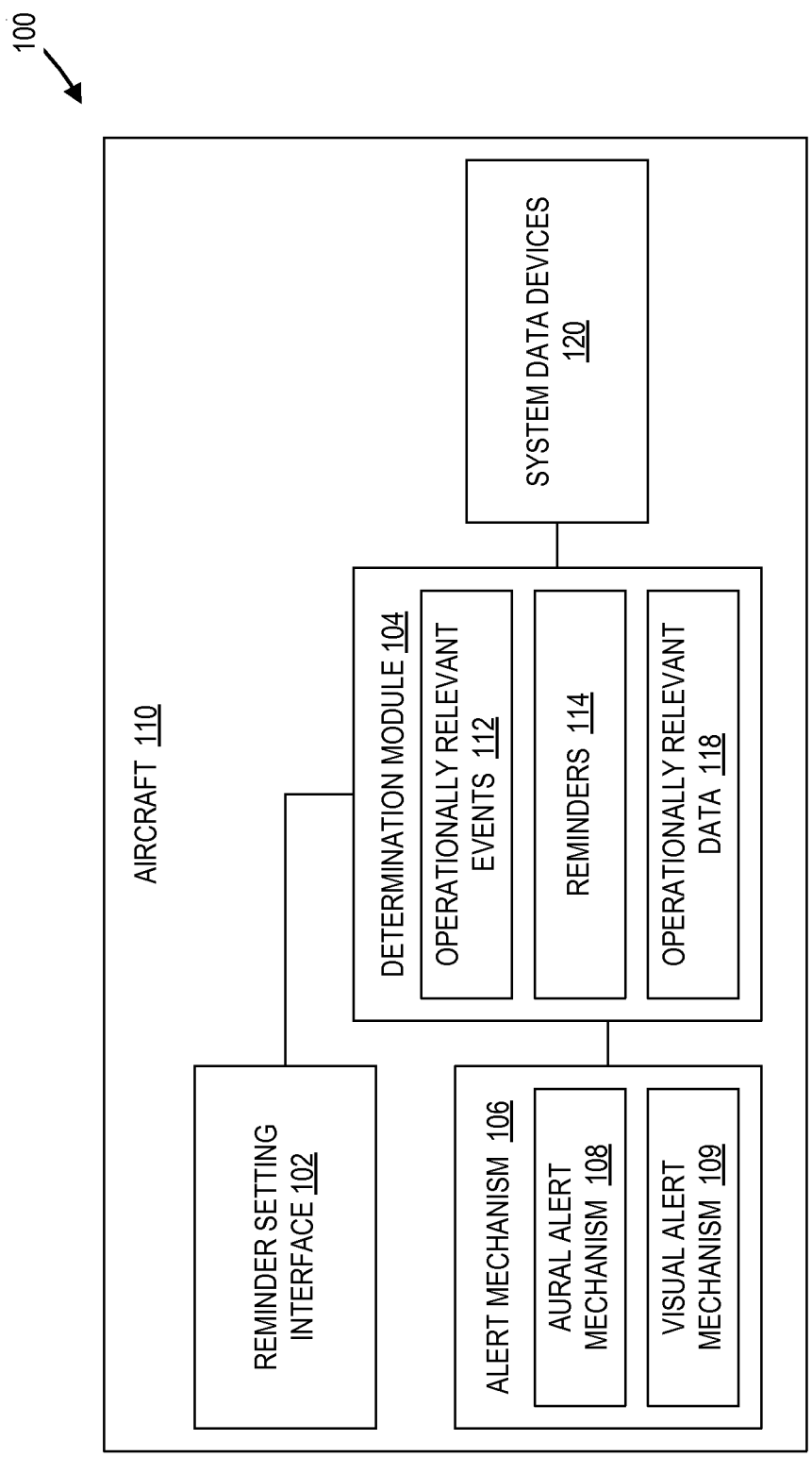
FIG. 1 is a block diagram showing an illustrative crew-defined reminder system architecture configured to provide an automatic reminder function, in accordance with some embodiments.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing an automatic reminder function will be described. FIG. 1 shows an illustrative crew-defined reminder system architecture 100 configured to provide an automatic reminder function, in accordance with some embodiments. The crew-defined reminder system architecture 100 may include a reminder setting interface 102, a determination module 104, and an alert mechanism 106, each of which is provided within an aircraft 110. Although the reminder setting interface 102 and the alert mechanism 106 are illustrated in FIG. 1 as separate devices, it should be appreciated that the reminder setting interface 102 and the alert mechanism 106 may be provided through a single device or any combination of two or more devices.

According to some embodiments, one or more of the reminder setting interface 102 and the alert mechanism 106 may be provided through existing instrumentation on the aircraft 110. For example, the reminder setting interface 102 may include a multi-function display ("MFD"), and the alert mechanism 106 may include an Engine Indicating and Crew Alerting System ("EICAS") display. In some other embodiments, the reminder setting interface 102 and/or the alert mechanism 106 may be provided through new instrumentation installed on the aircraft 110. Further, the reminder setting interface 102 and/or the alert mechanism 106 may be provided through instrumentation in the flight deck or other parts of the aircraft 110.

According to some embodiments, the alert mechanism 106 may include an aural alert mechanism 108 and a visual alert mechanism 109. The aural alert mechanism 108 may be adapted to provide aural alerts as specified by a flight crew member through the reminder setting interface 102. The visual alert mechanism 109 may be adapted to display visual alerts as specified by a flight crew member through the reminder setting interface 102. In some embodiments, the visual alert mechanism 109 may include a removable display.

In some embodiments, the reminder setting interface 102 may provide an interface whereby the flight crew can define reminders 114 based on the occurrence and/or non-occurrence of one or more operationally relevant events 112. For example, the reminder setting interface 102 may enable the flight crew to specify trigger values associated each of the operationally relevant events 112. The types of the reminders 114 provided by the reminder setting interface 102 may be set by the airline operating the aircraft 110 or by other suitable personnel. In some other embodiments, the flight crew may utilize the reminder setting interface 102 to specify whether the alert mechanism 106 provides only aural alerts, only visual alerts, or both aural and visual alerts for each of the reminders 114. The flight crew may further utilize the reminder setting interface 102 to specify the aural and/or visual alerts that are provided. For example, the flight crew may utilize the reminder setting interface 102 to specify text of the visual alert that is displayed by the visual alert mechanism 109.

The reminder setting interface 102 may also validate one or more of the trigger values entered by the flight crew. For example, if one of the trigger values corresponds to a time and the flight crew enters a time of "25:00," the reminder setting interface 102 may reject the time entry, issue an error message, and request that the flight crew enter a new, valid time. The reminder setting interface 102 may also provide additional functionality whereby the flight crew can enable and/or disable one or more of the reminders 114. For example, if the flight duration is relatively short such that the top of descent comes right after the top of climb (i.e., minimal cruise time), the flight crew may not enable or disable a reminder to notify the flight crew some amount of time prior to arriving at the top of descent.

Examples of the operationally relevant events 112 may include, but are not limited to, the following: reaching a specified time (e.g., Coordinated Universal Time ("UTC"), local time, etc.), a countdown for a specified period of time, reaching a specified waypoint, reaching a specified time or a specified distance prior to or after passing a specified waypoint, reaching a specified altitude, reaching a specified fuel load, crossing a specified latitude or longitude, reaching a specified fuel temperature, detecting when an estimated time of arrival ("ETA") has changed by a specified threshold, reaching a specified time or distance prior to a specified event (e.g., top of descent or arrival at destination), reaching a specified change in ETA at a specified location, and the like. Other examples and implementations of the operationally relevant events 112 may be similarly utilized as contemplated by one skilled in the art.

When the flight crew specifies the operationally relevant events 112, the operationally relevant events 112 may be stored in a suitable storage device (not shown). The determination module 104 then may monitor one or more system data devices 120 to identify operationally relevant data 118 that indicates the occurrence and/or non-occurrence of the operationally relevant events 112. For example, the operationally relevant data 118 may indicate whether the trigger values have been reached. As used herein, an "occurrence" refers to an instance where a planned event will occur, while a "non-occurrence" refers to an instance where a planned event will not occur. For example, if the aircraft 110 will not make it to a waypoint at the estimated time, this non-occurrence of the planned event can be reported to the flight crew as described herein.

The system data devices 120 may include sensors, clocks, navigational systems, and/or other suitable devices on the aircraft 110 adapted to provide the operationally relevant data 118 while the aircraft 110 is in flight. In one example, sensors may be coupled to the aircraft 110 and may include suitable transducers configured to collect at least some of the operationally relevant data 118. In another example, navigational systems on the aircraft 110 may provide an ETA to top of descent, ETA to destination, ETA to the next waypoint, and other navigational data. The operationally relevant data 118 may include, but is not limited to, current time, current position, current altitude, current fuel quantity, next waypoint, previous waypoint, ETA to destination, ETA to top of descent, and ETA to next waypoint. Other types of operationally relevant data 118 may be similarly collected and/or retrieved by the system data devices 120.

Upon identifying the operationally relevant data 118, the determination module 104 may determine whether the operationally relevant data 118 indicates that one or more of the reminders 114 are triggered by the occurrence and/or non-occurrence of at least some of the operationally relevant events 112. For example, the reminders 114 may be triggered if the corresponding trigger values have been reached according to the operationally relevant data 118. When the operationally relevant data 118 indicates that none of the reminders 114 have been triggered, the determination module 104 may continue monitoring the system data devices 120. When the operationally relevant data 118 indicates that one or more of the reminders 114 have been triggered, the determination module 104 may issue the triggered reminder by providing one or more of the aural and/or visual alerts corresponding to the triggered reminder through the alert mechanism 106.

As previously described, the flight crew may have specified, through the reminder setting interface 102, the aural and/or visual alerts that are provided through the alert mechanism 106 when one or more of the reminders 114 are triggered. For example, the flight crew may define, through the reminder setting interface 102, whether only aural alerts are provided, whether only visual alerts are provided, or whether both aural and visual alerts are provided. The flight crew may also define, through the reminder setting interface 102, the duration of the aural alert, the volume of the aural alert, the kind of aural alert, the text that is displayed in the visual alert, and the like.

When the determination module 104 issues the triggered reminder, the determination module 104 may terminate the triggered reminder or reset the triggered reminder. The determination module 104 may terminate the triggered reminder if the triggered reminder is a one-time reminder during the flight (e.g., change flight crew at a specified time). The determination module 104 may reset the triggered reminder if the triggered reminder is repeatable and can be triggered again at a later time during the flight (e.g., notify flight crew if ETA of the next waypoint exceeds a threshold).

Figure 2A:
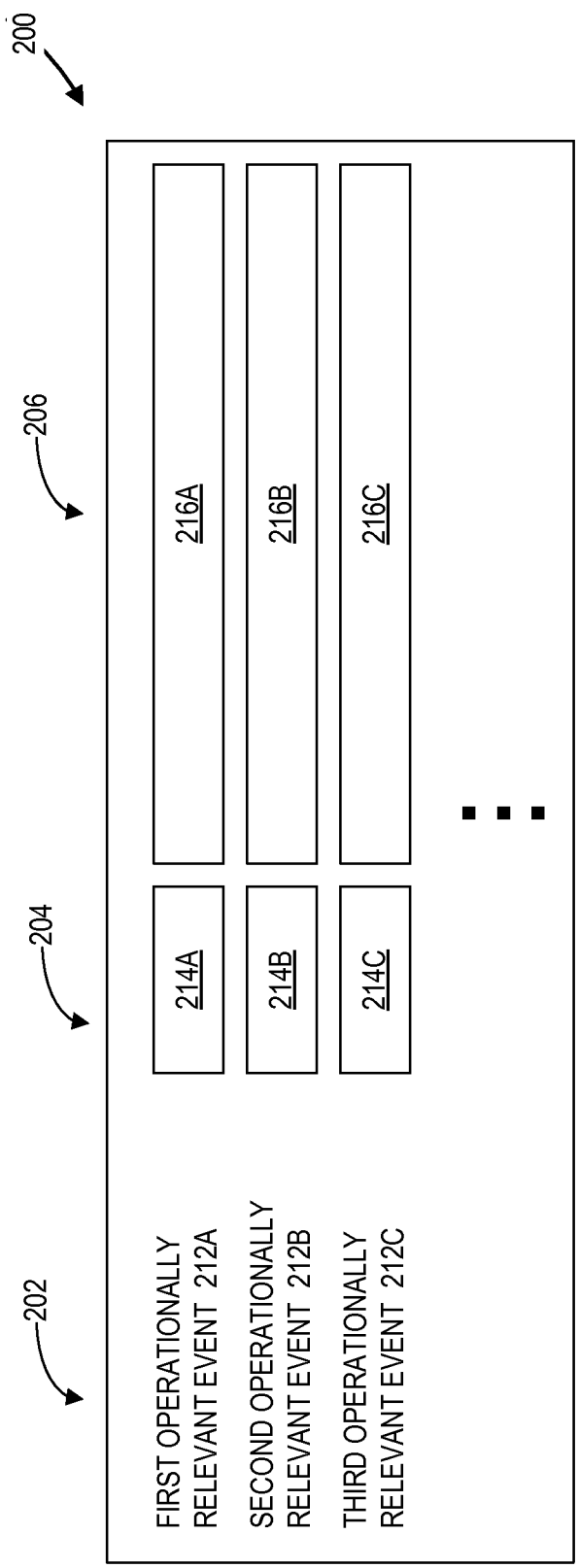
FIGS. 2A-2C are illustrative screen display diagrams provided by a reminder setting interface, in accordance with some embodiments.
Figure 2B:
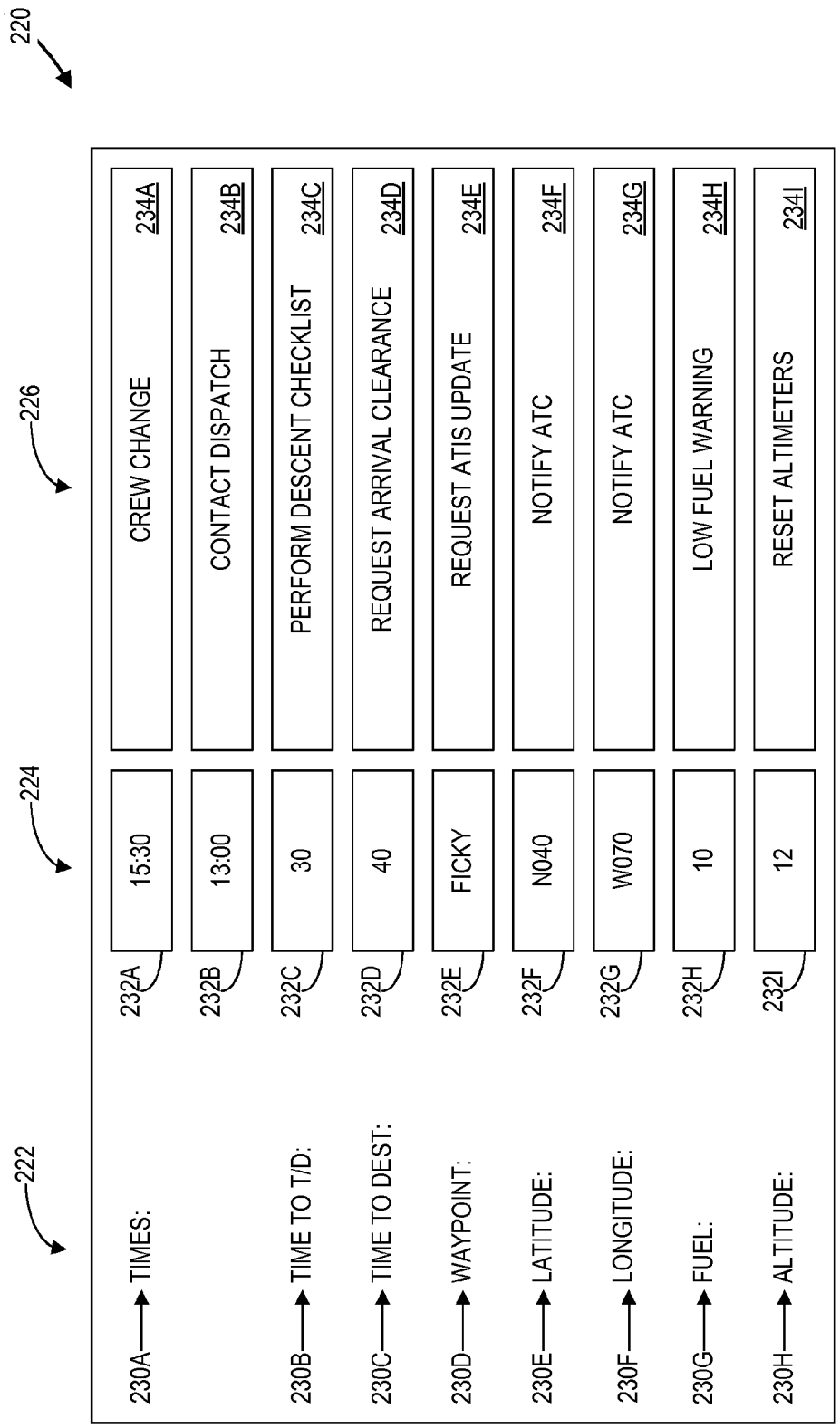
Figure 2C:
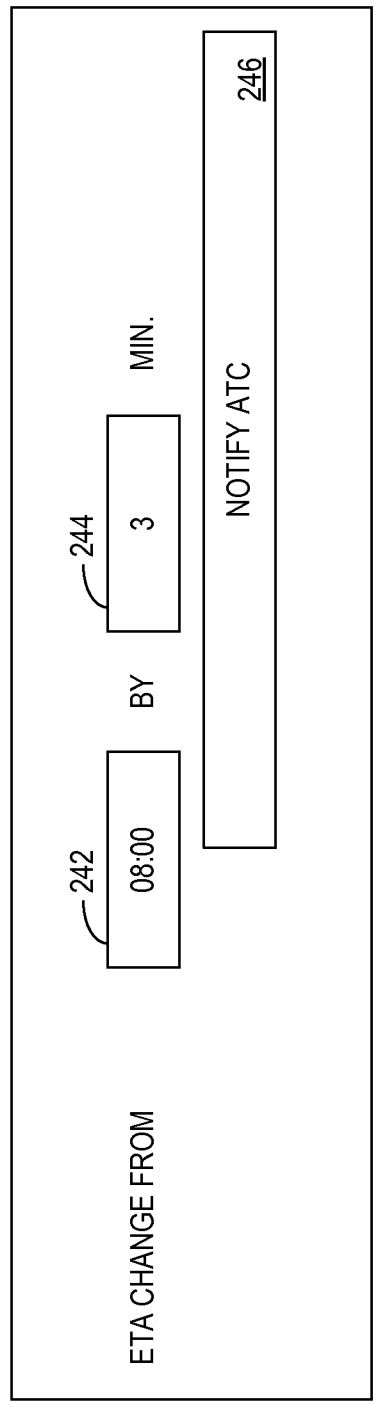

FIGS. 2A-2C show illustrative screen display diagrams 200, 220, 240 provided by the reminder setting interface 102, in accordance with some embodiments. It should be appreciated that the implementations of the reminder setting interface 102 illustrated in FIGS. 2A-2C are merely examples and are not intended to be limiting. As illustrated in FIG. 2A, the screen display diagram 200 may include a first column 202, a second column 204, and a third column 206. The first column 202 includes a list of the operationally relevant events 212A-212C, including the first operationally relevant event 212A, the second operationally relevant event 212B, and the third operationally relevant event 212C. The second column 204 includes entry windows 214A-214C enabling a flight crew member to define trigger values associated with each of the operationally relevant events 212A-212C. The first entry window 214A corresponds with the first operationally relevant event 212A, the second entry window 214B corresponds with the second operationally relevant event 212B, and the third entry window 214C corresponds with the third operationally relevant event 212C. The third column 206 includes entry windows 216A-216C enabling a flight crew member to specify reminders associated with each of the operationally relevant events 212A-212C. In particular, the first entry window 216A corresponds with the first operationally relevant event 212A, the second entry window 216B corresponds with the second operationally relevant event 212B, and the third entry window 216C corresponds with the third operationally relevant event 212C.

According to embodiments, a flight crew member may enter trigger values into the entry windows 214A-214C. Corresponding reminders may be triggered when one or more of the trigger values have been reached for the operationally relevant events 212A-212C. The determination module 104 may determine whether the trigger values have been reached based on the operationally relevant data 118. The flight crew member may specify the visual alerts associated with the operationally relevant events 212A-212C in the entry windows 216A-216C. For example, the flight crew member may enter text of the visual alerts into the entry windows 216A-216C. The reminder setting interface 102 may also enable the flight crew to specify the aural alerts for each of the reminders 114. For example, different tones may be associated with different reminders in order to distinguish between different aural alerts. Further, different visual alerts may be provided for different reminders. The reminder setting interface 102 may further enable the flight crew to enable and disable one or more of the reminders 114.

An example of the screen display diagram 200 is illustrated in the screen display diagram 200 of FIG. 2B. Referring now to FIG. 2B, the screen display diagram 220 includes a first column 222, a second column 224, and a third column 226. The first column 222 includes a list of operationally relevant events 230A-230H, including time 230A, time before reaching top of descent 230B, time before reaching destination 230C, name of a waypoint 230D, latitude 230E, longitude 230F, fuel level 230G, and altitude 230H. The second column 224 includes entry windows 232A-232I enabling a flight crew member to enter the trigger values corresponding to the events 230A-230H. For example, the first entry window 232A specifies a time of 15:30, and the second entry window 232B specifies a time of 13:00. The third entry window 232C specifies a time of thirty minutes before reaching top of descent. The fourth entry window 232D specifies a time of forty minutes before reaching the destination. The fifth entry window 232E specifies "FICKY" to be the waypoint. The sixth entry window 232F specifies a latitude of forty degrees north. The seventh entry window 232G specifies a longitude of seventy degrees west. The eighth entry window 232H specifies a fuel load of ten metric tons. The ninth entry window 232I specifies an altitude of 12,000 feet.

The third column 226 includes entry windows 234A-234I enabling a flight crew member to specify the visual alerts corresponding to the events 230A-230H. The first entry window 234A specifies a visual alert to change flight crew, which is triggered at time 15:30. The second entry window 234B specifies a visual alert to contact dispatch, which is triggered at time 13:00. The third entry window 234C specifies a visual alert to perform the descent checklist, which is triggered at thirty minutes prior to the top of descent. The fourth entry window 234D specifies a visual alert to request arrival clearance, which is triggered forty minutes before reaching the destination. The fifth entry window 234E specifies a visual alert to request an update from Automatic Terminal Information Service ("ATIS"), which is triggered upon reaching the specified waypoint. The sixth entry window 234F specifies a visual alert to notify air traffic control, which is triggered when the specified latitude is reached. The seventh entry window 234G specifies a visual alert to notify air traffic control, which is triggered when the specified longitude is reached. The eighth entry window 234H specifies a visual alert indicating a low fuel warning, which is triggered when the specified fuel load is reached. The ninth entry window 234I specifies a visual alert to reset the altimeters upon reaching the specified transition level.

It should be appreciated that two or more of the events 230A-230H may be combined to form a single reminder. For example, a reminder to notify air traffic control may be triggered when either a given time or a given position is first reached. When one or more of the reminders are triggered, the determination module 104 may display the corresponding visual alert as well as provide an additional audio alert. For example, the aural alert may cause the flight crew to view the visual alert.

It should be appreciated that the reminder setting interface 102 may also provide multiple entry windows to define multiple trigger values for a given reminder. Another example of the screen display diagram 200 is illustrated in the screen display diagram 240 of FIG. 2C. Referring now to FIG. 2C, the screen display diagram 240 enables a flight crew member to specify a reminder triggered by an ETA change beyond a given threshold. In particular, the screen display diagram 240 includes an entry window 242 where the flight crew member can enter a predicted ETA. In further embodiments, the entry window 242 may be automatically populated with the current predicted value (i.e., when this reminder is first enabled, when the previous waypoint is passed, etc.). The flight crew can then overwrite the automatically populated value if, for example, the ETA has since changed. The screen display diagram 240 further includes an entry window 244 where the flight crew member can enter the threshold (in minutes) by which the predicted ETA is changed in order to trigger the reminder. The flight crew member can specify the reminder in entry window 246. In the example illustrated in FIG. 2C, the entry window 242 specifies a predicted ETA of time 08:00, and the entry window 244 specifies a threshold of three minutes. The entry window 246 specifies a visual alert indicating a reminder to notify air traffic control, which is triggered when the predicted ETA changes by at least the threshold time.

Figure 3:
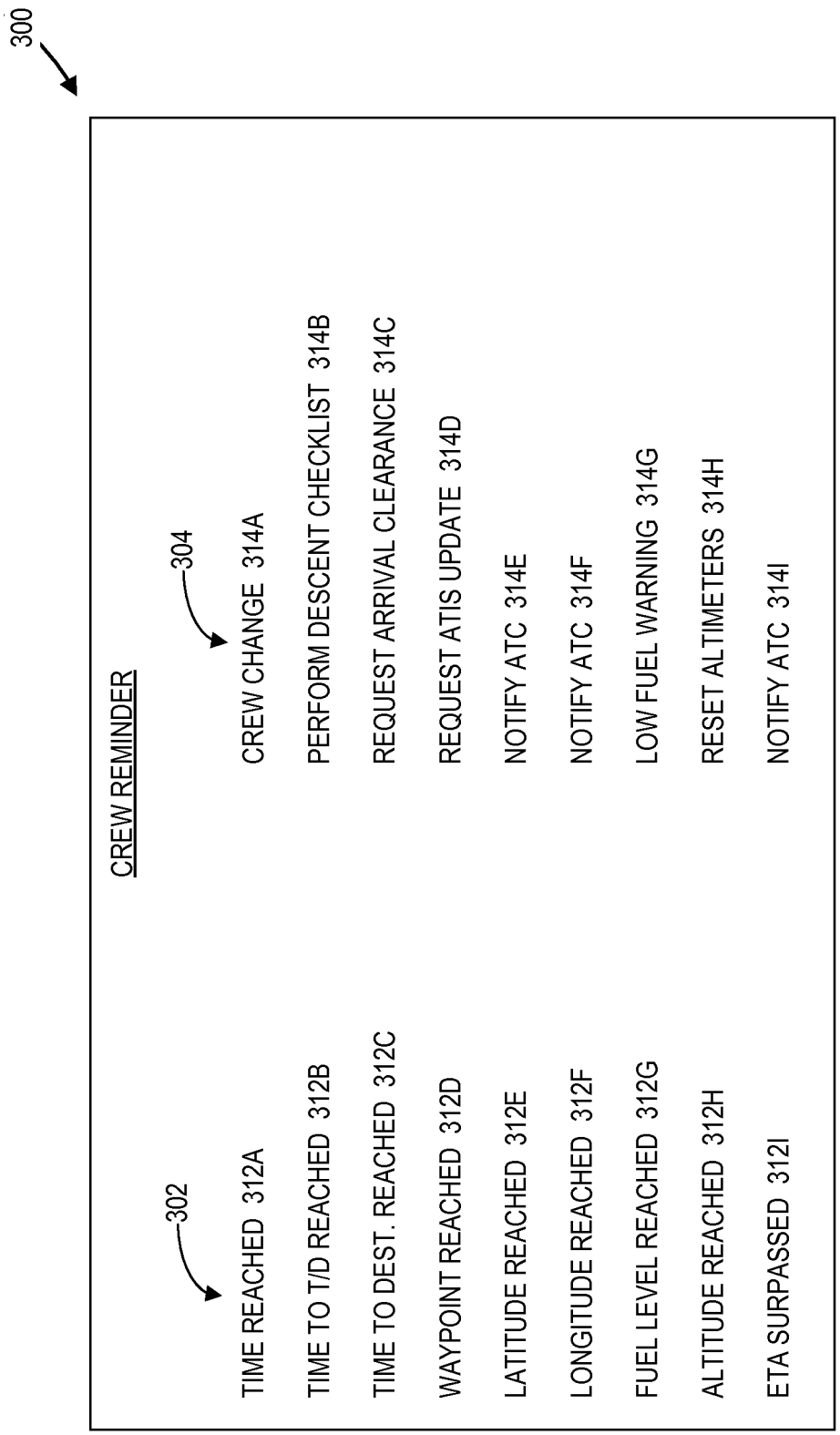
FIG. 3 is an illustrative screen display diagram provided by a visual alert mechanism, in accordance with some embodiments.

FIG. 3 shows an illustrative screen display diagram 300 provided by the visual alert mechanism 109, in accordance with some embodiments. The screen display diagram 300 includes a first column 302 and a second column 304. The first column 302 includes a list of events 312A-312I corresponding to the events 230A-230H. The second column 304 includes a list of visual alerts 314A-314I as specified in the entry windows 234A-234I, 246. The visual alert mechanism 109 may display one or more of the visual alerts 314A-314I corresponding to the triggered reminders.

Figure 4:
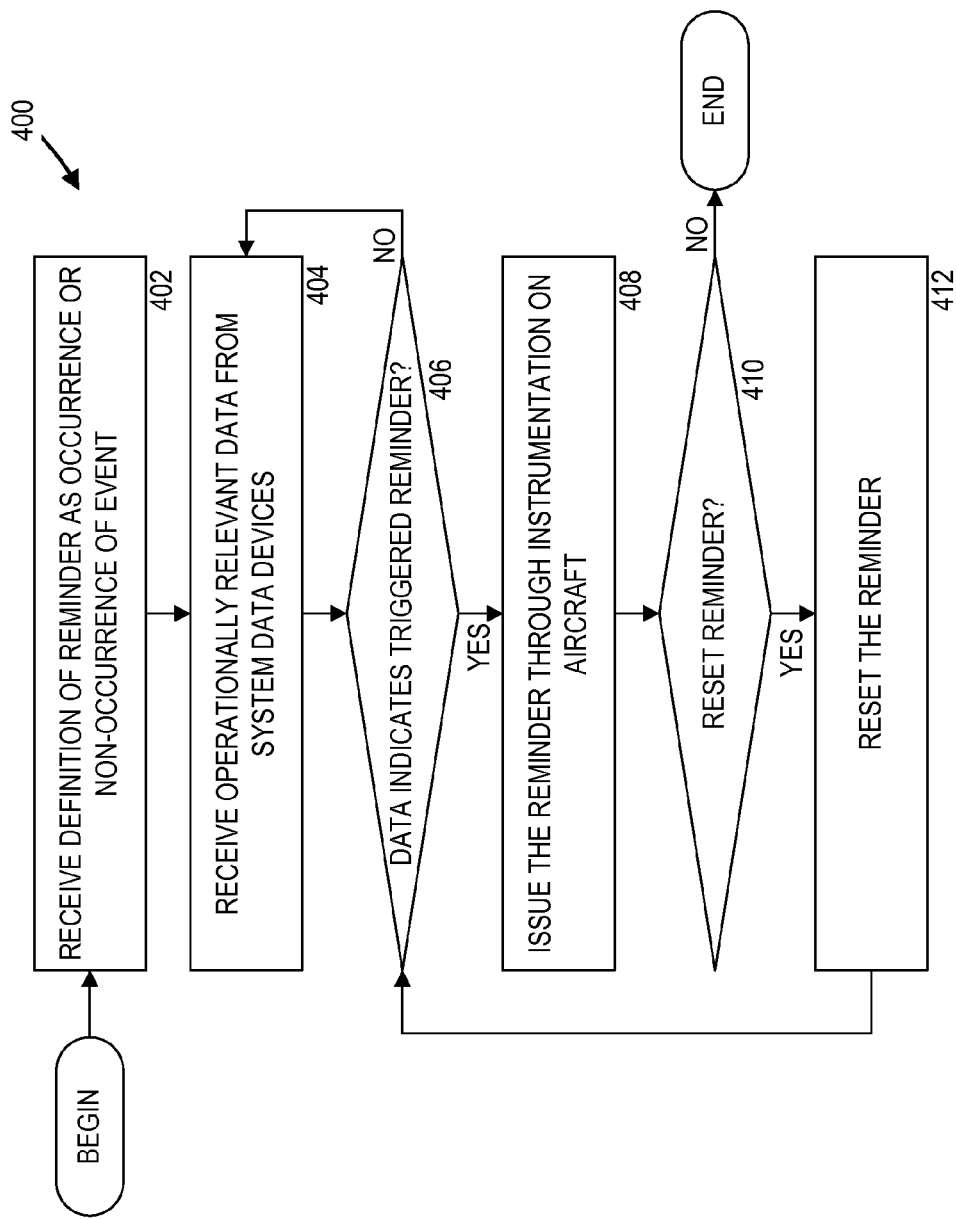
FIG. 4 is flow diagram illustrating aspects of an example method provided herein for providing an automatic reminder function, in accordance with some embodiments.

Referring now to FIG. 4, additional details will be provided regarding the operation of the determination module 104. In particular, FIG. 4 is a flow diagram illustrating aspects of an example method provided herein for providing an automatic reminder function, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

As shown in FIG. 4, a method 400 begins at operation 402, where the determination module 104 receives a definition of the reminders 114 from the reminder setting interface 102. In particular, a flight crew member may define each of the reminders 114 as the occurrence and/or non-occurrence of one or more of the operationally relevant events 112. For example, the flight crew member may define each of the reminders by specifying trigger values associated with one or more of the operationally relevant events 112. In further embodiments, the flight crew member may define the aural and/or visual alerts that are provided by the alert mechanism 106 responsive to the triggered reminder. For example, the flight crew member may specify the kind of aural alerts and the text of the visual alerts. When the determination module 104 receives a definition of the reminders 114 from the reminder setting interface 102, the method 400 proceeds to operation 404.

At operation 404, the determination module 104 receives the operationally relevant data 118 from the system data devices 120. The method 400 then proceeds to operation 406, where the determination module 104 determines whether one or more of the reminders 114, as defined by the flight crew member through the reminder setting interface 102, is triggered based on the operationally relevant data 118. In particular, the operationally relevant data 118 may indicate the occurrence and/or non-occurrence of one or more of the operationally relevant events 112. For example, the operationally relevant data 118 may indicate that the specified trigger values have been reached.

If none of the reminders 114 have been triggered, then the method 400 proceeds back to operation 404, and the determination module 104 continues monitoring the system data devices 120. If one or more of the reminders 114 have been triggered, then the method 400 proceeds to operation 408, where the determination module 104 issues the triggered reminders through instrumentation, such as flight deck instrumentation, on the aircraft 110. For example, the determination module 104 may provide aural and/or visual alerts associated with the triggered reminders through the alert mechanism 106. In particular, the aural alert mechanism 108 may provide the aural alerts, and the visual alert mechanism 109 may display the visual alerts. When the determination module 104 issues the triggered reminder, the method 400 proceeds to operation 410.

At operation 410, the determination module 104 determines whether the triggered reminder should be reset to an untriggered state. For example, if the triggered reminder is a repeatable reminder, then the triggered reminder may need to be reset. If the triggered reminder is a one-time reminder, then the triggered reminder may not need to be reset. If the determination module 104 determines that the triggered reminder should be reset, then the method 400 proceeds to operation 412, where the triggered reminder is reset to an untriggered state. The method 400 then proceeds back to operation 406 to identify further instances where the reminder is triggered. If the determination module 104 determines that the triggered reminder should not be reset, then the method 400 terminates, thereby also terminating the triggered reminder.

Figure 5:
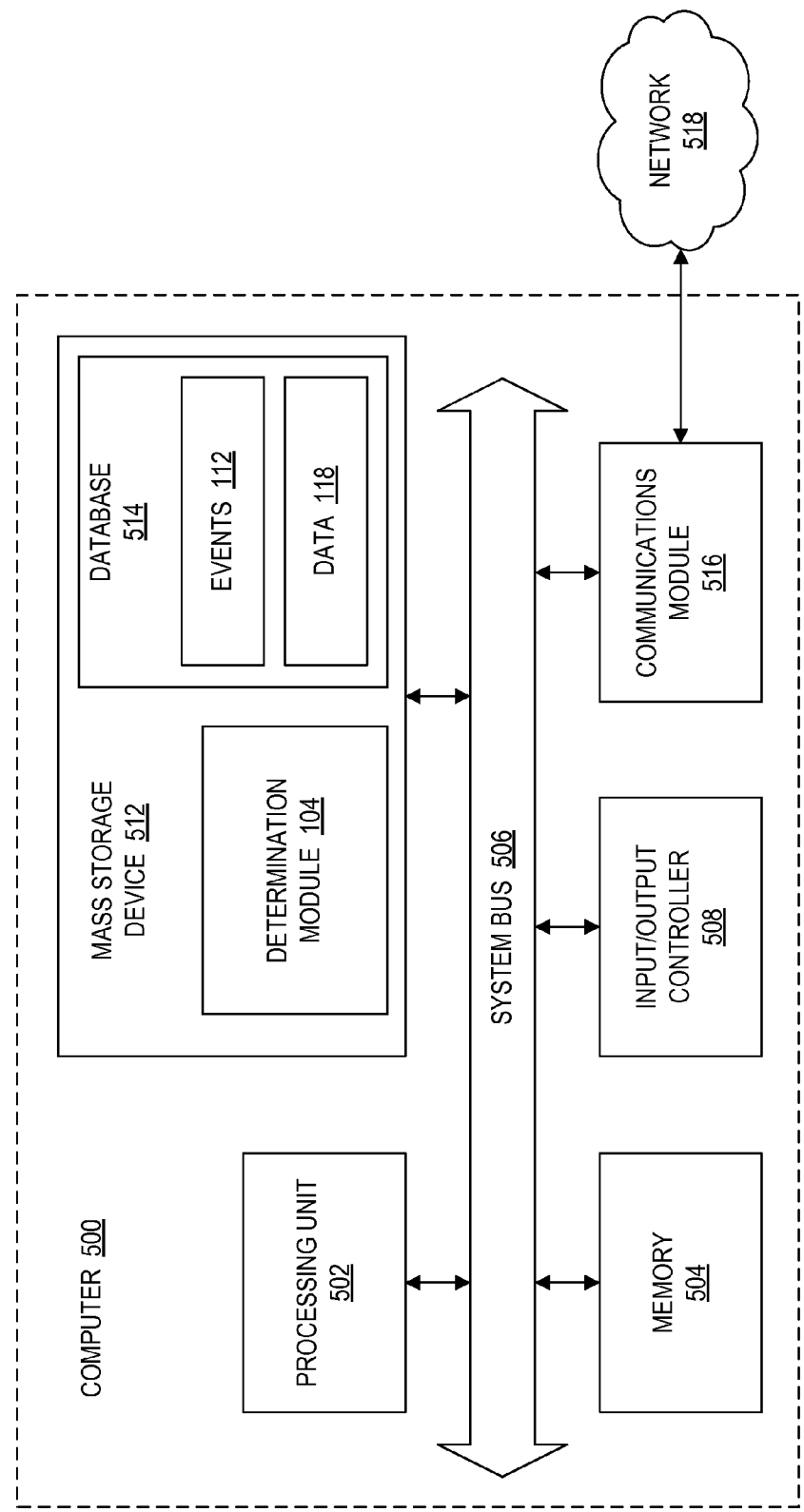
FIG. 5 is a computer architecture diagram showing aspects of an illustrative computer hardware architecture for a computing system capable of implementing aspects of the embodiments presented herein.

Referring now to FIG. 5, an exemplary computer architecture diagram showing aspects of a computer 500 is illustrated. The computer 500 may be configured to execute the determination module 104. The computer 500 includes a processing unit 502 ("CPU"), a system memory 504, and a system bus 506 that couples the memory 504 to the CPU 502. The computer 500 further includes a mass storage device 512 for storing one or more program modules, such as the determination module 104, and one or more databases 514. For example, the databases 514 may store the operationally relevant events 112 and the operationally relevant data 118, among other information. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 516 connected to the bus 506. It should be appreciated that other types of network interface units may also be utilized to connect to other types of networks and remote computer systems. The computer 500 may also include an input/output controller 508 for receiving and processing input from a number of input devices (not shown), including a keyboard and a mouse. Similarly, the input/output controller 508 may provide output to a display or other type of output device (not shown) connected directly to the computer 500.

Based on the foregoing, it should be appreciated that technologies for providing an automatic reminder function are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing an automatic reminder function, the method comprising computer-implemented operations for:
    displaying a reminder setting interface at a visual display, the reminder setting interface including
        a first display portion for displaying input regarding a plurality of operationally relevant events, each of the plurality of operationally relevant events being an occurrence and/or non-occurrence of one or more events associated with the operation of an aircraft,
        a second display portion for receiving and displaying trigger values for each of the plurality of operationally relevant events, and
        a third display portion for receiving and displaying an alert for a reminder for each of the plurality of operationally relevant events;
    displaying on the visual display the plurality of operationally relevant events;
    receiving at least one trigger value on the visual display from at least one flight crew member;
    receiving at least one alert for the reminder on the visual display from at least one flight crew member, wherein the alert for the reminder corresponds to one of an occurrence or a non-occurrence of the at least one of the plurality of operationally relevant events;
    receiving operationally relevant data from a system data device;
    determining that at least one of the trigger values associated with the alert for the reminder for each of the plurality of operationally relevant events have been reached based on the operationally relevant data indicating one of the occurrence or non-occurrence of one or more of the plurality of operationally relevant events; and
    issuing the alert for the reminder in response to determining that one or more trigger values have been reached.

2. The computer-implemented method of claim 1, wherein each of the plurality of operationally relevant events comprises at least one of
    reaching a specified time,
    reaching a countdown for a specified period of time,
    reaching a specified waypoint, reaching a specified time or a specified distance prior to or after passing a specified waypoint,
    reaching a specified altitude,
    reaching a specified fuel load,
    crossing a specified latitude or longitude,
    reaching a specified fuel temperature,
    detecting when an estimated time of arrival (ETA) has changed by a specified threshold,
    reaching a specified time or distance prior to a specified event, or
    reaching a specified change in ETA at a specified location.

3. The computer-implemented method of claim 1, further comprising determining one of the alerts for the reminder is a repeatable reminder and resetting the repeatable reminder upon issuing the repeatable reminder.

4. The computer-implemented method of claim 1, the method comprising further computer-implemented operations for:
    determining whether one of the trigger values is an invalid trigger value; and
    responsive determining whether one of the trigger values is an invalid trigger value, displaying an error message indicating that that the trigger value is an invalid trigger value.

5. The computer-implemented method of claim 4, wherein the reminder setting interface further enables the at least one flight crew member to select the alert for the reminder being one of only an aural alert, only a visual alert, or both the aural alert and the visual alert;
    wherein receiving the alter for the reminder further comprises receiving a selection of one of only the aural alert, only the visual alert, or both the aural alert and the visual alert through the reminder setting interface; and
    wherein issuing the alter for the reminder through instrumentation on the aircraft comprises providing one of only the aural alert, only the visual alert, or both the aural alert and the visual alert through an alert mechanism according to the selection.

6. The computer-implemented method of claim 5, wherein the alert mechanism comprises an Engine Indicating and Crew Alerting System ("EICAS") display.

7. The computer-implemented method of claim 4, wherein the reminder setting interface further enables the at least one flight crew member to specify text of a visual alert;
    wherein receiving the alert for the reminder further comprises receiving the text of the visual alert from the at least one flight crew member through the reminder setting interface; and
    wherein issuing the alert for the reminder through instrumentation on the aircraft comprises displaying the text of the visual alert through the visual display.

8. The computer-implemented method of claim 4, wherein the reminder setting interface further enables the at least one flight crew member to specify the duration of the aural alert, the volume of the aural alert, and the kind of aural alert;
    wherein receiving the alters for the reminder further comprises receiving a specification of at least one of the duration of the aural alert, the volume of the aural alert, and the kind of aural alert through the reminder setting interface; and
    wherein issuing the alert for the reminder through instrumentation on the aircraft comprises issuing the aural alert or the visual alert through an alert mechanism according to the specification.

9. The computer-implemented method of claim 4, wherein the visual display comprises a multi-function display ("MFD").

10. The computer-implemented method of claim 4, wherein receiving operationally relevant data from the system data device comprises receiving the operationally relevant data from at least one of a sensor coupled to the aircraft and a navigational system coupled to the aircraft.

11. The computer-implemented method of claim 1, the method comprising further computer-implemented operations for validating, by the reminder setting interface, the trigger values associated with the one or more reminders.

12. The computer-implemented method of claim 1, wherein the plurality of operationally relevant events further define at least one of
   a specified time,
   a specified period of time,
   a specified waypoint,
   a specified distance,
   a specified altitude,
   a specified fuel load,
   a specified latitude,
   a specified longitude,
   a specified time or distance prior to a specified event, and
   a specified change in predicted arrival time at a specified location.

13. A system for providing an automatic reminder function, the system comprising:
   a processor;
   a memory coupled to the processor; and
   a program module (i) which executes in the processor from the memory and (ii) which, when executed by the processor, causes the system to provide the automatic reminder function by
   displaying a reminder setting interface at a visual display, the reminder setting interface including
      a first display portion for displaying input regarding a plurality of operationally relevant events, each of the plurality of operationally relevant events being an occurrence and/or non-occurrence of one or more events associated with the operation of an aircraft
      a second display portion for receiving and displaying trigger values for each of the plurality of operationally relevant events, and
      a third display portion for receiving and displaying an alert for a reminder for each of the plurality of operationally relevant events;
   displaying on the visual display the plurality of operationally relevant events;
   receiving at least one trigger value on the visual display from at least one flight crew member;
   receiving at least one alert for the reminder on the visual display from at least one flight crew member, wherein the alert for the reminder corresponds to one of an occurrence or a non-occurrence of the at least one of the plurality of operationally relevant events;
   receiving operationally relevant data from a system data device;
   determining that at least one of the trigger values associated with the alert for the reminder for each of the plurality of operationally relevant events have been reached based on the operationally relevant data indicating one of the occurrence or non-occurrence of one or more of the plurality of operationally relevant events; and
   issuing the alert for the reminder in response to determining that one or more trigger values have been reached.

14. The system of claim 13, wherein issuing the alert for the reminder in response to determining that one or more trigger values have been reached being performed by an alert mechanism comprises:
   an aural alert mechanism adapted to provide an aural alert; and
   a visual alert mechanism adapted to display a visual alert.

15. The system of claim 13, wherein receiving at least one alert for the reminder from the at least one flight crew member comprises receiving an instruction to enable at least one alert for the reminder.

16. The system of claim 15, wherein receiving at least one alert for the reminder from the at least one flight crew member further comprises receiving an instruction to disable one or more of the alerts for the reminders corresponding to the occurrence or non-occurrence of one or more other operationally relevant events.

17. The system of claim 13, wherein the program module, when executed by the processor, further causes the system to provide the automatic reminder function by
   upon issuing at least one of an aural alert and a visual alert through an alert mechanism in flight deck instrumentation, determining whether the alert for the reminder associated with the at least one aural alert or the visual alert is one of a one-time reminder or a repeatable reminder,
   responsive to determining that the alert for the reminder is a one-time reminder, terminating the reminder, and
   responsive to determining that the alert for the reminder is a repeatable reminder, resetting the alert for the reminder.

18. A non-transitory computer-readable storage medium having computer-executable instructions stored thereon which, when executed by a computer, cause the computer to:
   display a reminder setting interface at a visual display, the reminder setting interface including
      a first display portion for displaying input regarding a plurality of operationally relevant events, each of the plurality of operationally relevant events being an occurrence and/or non-occurrence of one or more events associated with the operation of an aircraft
      a second display portion for receiving and displaying trigger values for each of the plurality of operationally relevant events, and
      a third display portion for receiving and displaying an alert for a reminder for each of the plurality of operationally relevant events;
   displaying on the visual display the plurality of operationally relevant events;
   receive at least one trigger value on the visual display from at least one flight crew member;
   receive at least one alert for the reminder on the visual display from at least one flight crew member, wherein the alert for the reminder corresponds to one of an occurrence or a non-occurrence of the at least one of the plurality of operationally relevant events;
   receive operationally relevant data from a system data device;
   determine that at least one of the trigger values associated with the alert for the reminder for each of the plurality of operationally relevant events have been reached based on the operationally relevant data indicating one of the occurrence or non-occurrence of one or more of the plurality of operationally relevant events; and
   issue the alert for the reminder in response to determining that one or more trigger values have been reached.

* * * * *